June 12, 1962        J. R. TAYLOR ETAL        3,038,438
INDICATING DEVICE

Filed Sept. 22, 1960

INVENTORS
JAY R. TAYLOR
RICHARD J. KAVANAUGH
BY
Ronnie Edward, Morton Barrows & Taylor
ATTORNEYS united States Patent Office 3,038,438
Patented June 12, 1962

3,038,438
INDICATING DEVICE
Jay R. Taylor, Morris, and Richard J. Kavanaugh, Bristol, Conn., assignors to Consolidated Electronics Industries Corp., Waterbury, Conn., a corporation of Delaware
Filed Sept. 22, 1960, Ser. No. 57,778
5 Claims. (Cl. 116—115)

The present invention relates to indicating devices, and more particularly to a novel, improved and simplified mechanism for indicating or reflecting relative conditions of a machine or apparatus.

In general, the invention is directed to the provision of a device for indicating the condition of an apparatus, instrument, machine, etc. Within the contemplation of the foregoing, the device of the invention may be utilized to present various types of information in accordance with the operating condition of an apparatus, etc. More specifically, the invention provides an indicating device of the general nature described above which is characterized by its substantial simplicity and low cost, as well as by its inherent reliability.

In accordance with one aspect of the invention, a novel and improved indicating means is provided which includes a pair of indicia-bearing members, one of which is substantially obscured by the other. The obscuring indicia-bearing member is mounted for movement and is provided with a number of effectively transparent portions, such as slots or openings, such that, when the obscuring member is in movement at relatively high speed, the normally obscured indicia becomes primarily visible to the casual observer through repeated scannings by the effectively transparent portion or portions, while the indicia of the obscuring member becomes blurred and effectively invisible through the rapidity of its movement. Accordingly, the indicia primarily apparent to a viewer will be that of the movable element or member, when that member is either motionless or in relatively slow movement, while the indicia of the normally obscured, fixed element or member will be primarily visible when the movable element is in motion at relatively high speed.

In one advantageous application of the new indicating device, the device is used to reflect the operating condition (i.e., "off-on," "high-speed-low-speed," etc.) of a machine or apparatus having a rotating element or a moving element whose motion can be translated into rotation. In such cases, the indicator may be mechanically interconnected with the moving parts of the apparatus or mechanism whose operation is to be monitored. In other cases, where the nature of the indication, the location of the indicator or other reason dictates, the indicator may be driven by a separate motor.

In one advantageous specific form of the invention, the first indicia-bearing member may comprise a fixed plate or wall, on which is provided suitable indicia, such as appropriate lettering, coloring, etc. The second or moving indicia-bearing member may be in the form of a disc provided with a plurality of effectively transparent portions, such as openings or radial slots, between which are provided suitable repetitive indicia. When the disc is motionless or moving slowly, the indicia of the disc is primarily visible. However, when the disc is rotating at high speed, the indicia of the disc is blurred by the movement. At the same time, the fixed indicia on the plate or wall is exposed repeatedly through the slots or openings, and the fixed indicia then becomes primarily visible to the observer.

As will become apparent upon consideration of the nature of the invention, the new indicator may take a variety of specific forms. Accordingly, for a better understanding of the invention and a detailed description of certain specific, advantageous forms thereof, reference should be made to the following detailed description and to the accompanying drawing, in which.

Figure 1:
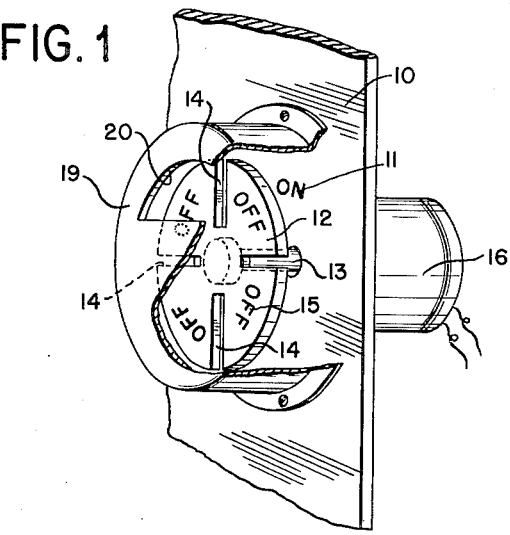
FIG. 1 is a perspective view, partly broken away, of one form of the indicator of the invention.
Figure 3:
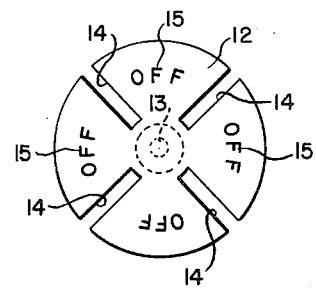
FIG. 3 is a front elevational view of a disc-like, rotating indicia-bearing member incorporated in the device of FIG. 1.
Figure 4:
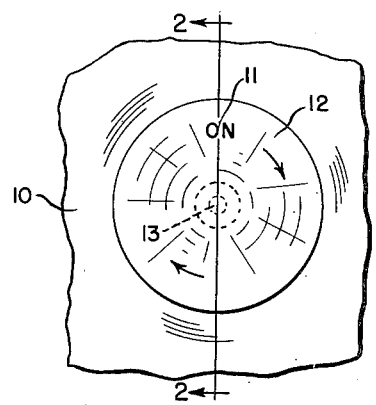
FIG. 4 is a schematic representation, with the housing removed, of the indicator of FIG. 1, with the rotating indicia-bearing member thereof in relatively high-speed motion.
Figure 2:
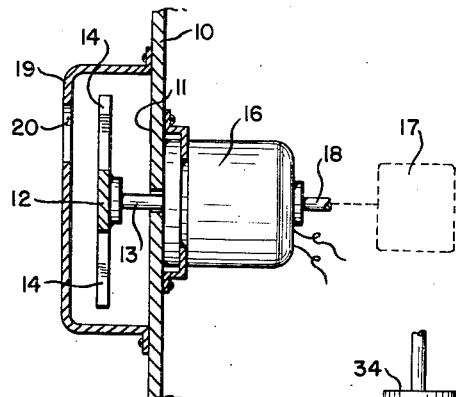
FIG. 2 is a cross-sectional view, taken along line 2—2 of FIG. 4, of the indicator of FIG. 1.

Referring now to the drawing, and initially to FIGS. 1–4 thereof, the reference numeral 10 designates a plate or wall, which may be the wall of a cabinet, for example, or simply a small plate adapted to be attached to a cabinet or panel. The plate 10 constitutes a first indicia-bearing member and, in the specific, illustrated device bears the indicia "on" as indicated at 11. In the operating device, the plate 10 and its indicia 11 are stationary.

Positioned directly in front of the plate 10 is a second indicia-bearing member in the form of a disc 12, which is mounted on a shaft 13 for rotation with respect to the plate 10. In the illustrated device, the disc 12 has a plurality (four) of radial slots 14, which are relatively narrow with respect to the body of the disc such that the disc is substantially continuous to the casual observer. Between the slots 14, which constitute transparent portions, the disc is opaque, and the outer surface of the opaque portions are provided with repetitive indicia, such as the words "off" indicated at 15.

The disc supporting shaft 13 may be connected to a rotating element of an apparatus or device whose operation is to be monitored by the indicator. However, where desirable or expedient, an individual drive motor may be provided, together with a control circuit for effecting actuation of the motor in accordance with conditions of a unit being monitored. In the specific device of FIG. 1, the shaft 13 is connected directly to an electric motor 16, which may be an individual drive motor for the disc or, more advantageously, may be the drive motor for a monitored apparatus 17, to which the motor is connected through its shaft 18.

For unit protection and clearer indication, a cover or housing 19 is secured to the plate 10, substantially enclosing the disc 12 and its indicia 15, as well as the indicia 11 on the plate itself. The housing 19 is provided with an opening 20, the size and location of which is beneficially designed in order that indicia of the disc 12 is visible in any rotational orientation of the disc. Likewise, the location of the indicia 11 on the plate 10 is such that the indicia 11 would be visible through the opening 20, except for the obscuring interposition of the disc 12.

In accordance with the invention, the fixed indicia 11 is located directly behind the path of movement of the openings or slots 14 constituting the transparent portions of the disc 12. However, the relationship between the indicia 11, the slots 14 and the indicia 15 is such that the indicia 11 is primarily obscured, relative to the indicia 15, when the disc 12 is motionless or moving at relatively slow speed.

In the normal operation of the device of FIG. 1, the indicator is intended to respond to two operating conditions of the monitored instrument (in this case the instrument 17 and motor 16) such that "off" and "on" conditions or "high-speed" and "low-speed" conditions are indicated or such that directive or other information is presented in response to such conditions. With the illustrated indicia, "off" and "on" conditions of the instrument 17 and motor 16 are indicated. Thus, when the motor 16 is deenergized, the disc 12 will be motionless, and the "on" indicia 11 is effectively obscured by the disc 12 while the "off" indicia 15 is primarily visible to the observer through the opening 20 in the cover or housing 19. When the motor 16 is energized to operate the instrument 17, the disc 12 is caused to rotate and, by means of appropriate gear train assemblies, if necessary or desirable, the rotational speed of the disc 12 is such, in relation to the size of its radial openings 14 and the relative visual predominance of the indicia 11, 15, that the "off" indicia 15 on the disc are effectively obliterated by movement, while the repeated scanning of the "on" indicia 11 by the slots 14 causes that indicia to become primarily visible through the opening 20. This condition is indicated schematically in FIG. 4, wherein the disc 12 is indicated to be rotating at relatively high speed, obliterating its indicia 15 and rendering the otherwise normally obscured "on" indicia 11 primarily visible to the observer.

For ideal indication, the indicia on the disc 12 is sufficiently repetitive so that, when the motor 16 subsequently is deenergized, the "off" indicia 15 will always be visible through the opening 20, regardless of the rotational position in which the disc 12 comes to a halt. Further, the width of the slots or openings 14 is beneficially designed to be somewhat less than the total width of the indicia 11 so that, if one of the openings stops directly over the fixed indicia, it is not wholly visible through the casing opening 20. The last described relationship is not critical, however, since the important practical relationship is that the indicia of the disc be primarily visible upon casual observation when the disc is stopped. That is, even though the "on" indicia 11 be fully visible through the openings 14, with such an opening stopped in direct alignment with the indicia, the principal requirements of the device are met if the indicia 15 of the disc remain predominantly attractive to the eye, by reason of relative color brillance, size, etc.

Figure 5:
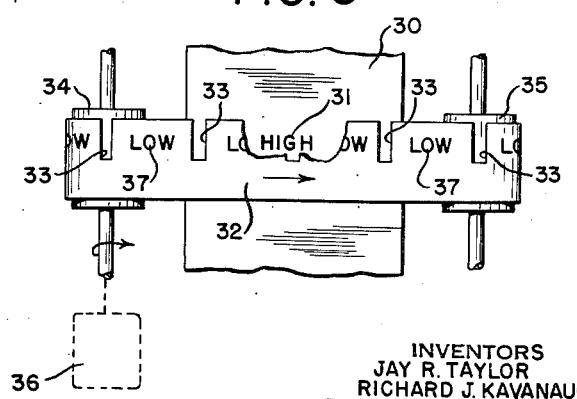
FIG. 5 is a simplified, fragmentary representation of a second form of the indicator of the invention, with parts broken away to illustrate certain features of construction.

In the form of the invention illustrated in FIG. 5, a fixed plate 30 is provided with indicia 31. The indicia 31 normally is obscured by a second indicia-bearing member 32 which, in the illustrated modification, is in the form of an endless belt. The belt 32 is provided with a plurality of openings 33, such as vertical slots, which constitute transparent areas, and the path of movement of the belt 32 is such as to carry the slots 33 in scanning relation to the fixed indicia 31.

In the device of FIG. 5, the indicia-bearing belt 32 is trained about a pair of spaced drums 34, 35, driven by a motive source 36, which may be a machine or instrument to be monitored or may be a separate motor energized in accordance with an operation to be monitored.

The device of FIG. 5 advantageously includes a housing or casing (not shown) aligned with the fixed indicia 31, although such a housing is not critically necessary to the effective operation of the device.

Between each of the slots or openings 33 of the belt there is provided indicia 37. In this instance, the indicia 37 carried by the belt constitutes the word "low," which appears repetitively about the entire length of the belt. The fixed indicia is the word "high." The device thus is adapted to indicate high-speed and low-speed operation of the monitored apparatus 36. Thus, when the apparatus 36 is operating at low speed, the belt 32 is carried slowly across the face of the indicia-bearing plate 30, the speed of movement being such, in relation to the relative predominance of the fixed and moving indicia and the size of the openings 33, that the "low" indicia 30 remain primarily visible to the casual observer. When the machine 36 is in high-speed operation, the more rapid movement of the belt 32 is such as to obscure by motion the "low" indicia 37 and to scan the "high" indicia 31 at such frequency that it becomes readily observable and primarily visible to the casual viewer.

The specific forms of the invention described herein are merely illustrative, of course, of many possible variations of elements and indicia forms. In all cases, however, the fundamental concept may be drawn upon to provide specific varieties of indicator devices. By way of example only, the indicia may be a color or shape, rather than a word or words, and the obscuring, movable indicia-bearing member need not have openings or cut-out portions in an otherwise opaque body, but may have portions which are relatively more transparent and portions which are relatively more opaque than others. Thus, where reference is made in the specification and claims to "transparent" and "opaque" portions or members, it is to be understood that the terms are not to be construed in a strict or limiting sense but are to include alternatives which are transparent or opaque in their effect upon the observer. In each instance the exact form of the device is governed by the concept that movable indicia be primarily visible when stopped or slowly moving, while the fixed indicia be primarily visible when scanned by rapid movement of the movable indicia-bearing member.

The new indicating device is characterized by its inherent simplicity and its economy of manufacture, and also by its substantial reliability in operation. Its many advantages are even more pronounced in connection with applications in which the movable indicia-bearing member is mechanically coupled directly to a device or apparatus whose operation is to be monitored, reflected or utilized as a basis of instructive or directive indication.

In view of the many specific forms which the invention may assume in its various physical embodiments, reference should be made to the following appended claims in determining the full scope of the invention.

We claim:

1. Indicating means for presenting information in accordance with relative operating conditions to be monitored comprising a first indicia-bearing member, a second indicia-bearing member positioned in proximity to said first indicia-bearing member, said second indicia-bearing member having spaced opaque portions partially impeding visual access to said first indicia-bearing member but having transparent portions providing visual access thereto, means mounting said second indicia-bearing member for movement relative to said first indicia-bearing member to carry said transparent and opaque portions alternately past indicia of said first indicia-bearing member, and means for driving said second indicia-bearing member in accordance with the operating conditions to be monitored, the indicia of said second indicia-bearing member being primarily visible when said second indicia-bearing member is in a condition of relatively slow movement, and the indicia of said first indicia-bearing member being exposed by said transparent portions and being primarily visible when said second indicia-bearing member is in a condition of relatively rapid movement.

2. The indicating means of claim 1, in which the second indicia-bearing member is mounted for movement in a predetermined closed path and has alternate opaque and transparent portions, said opaque and transparent portions being of such relative proportions that said opaque portions are substantially predominant when said second indicia-bearing member is in a condition of relatively slow movement and said transparent portions are substantially predominant when said second indicia-bearing element is in a condition of relatively rapid movement.

3. The indicating means of claim 2, in which said second indicia-bearing member comprises a disc mounted for rotation, said disc having an opaque surface and having a plurality of openings therein, the indicia of said first indicia-bearing member being located in substantial alignment with the path of movement of said openings.

4. The indicating means of claim 2, in which said second indicia-bearing member comprises an endless belt having openings therein at spaced intervals.

5. The indicating means of claim 1, which includes an opaque cover substantially surrounding said first and second indicia-bearing members and having a transparent portion aligned with the indicia on said first indicia-bearing member, said second indicia-bearing member being interposed between said transparent portion and said first indicia-bearing member.

References Cited in the file of this patent

UNITED STATES PATENTS 2,204,260     Smith _____ June 11, 1940